United States Patent [19]

Kiyoura et al.

[11] Patent Number: 4,822,589

[45] Date of Patent: Apr. 18, 1989

[54] MANUFACTURING PROCESS OF CHLORINE

[75] Inventors: Tadamitsu Kiyoura, Kawasaki; Yasuo Kogure, Yokosuka; Tokio Nagayama, Yokohama; Kazuo Kanaya, Kamakura, all of Japan

[73] Assignee: Mitsui Toatsu Chemicals, Incorporated, Tokyo, Japan

[21] Appl. No.: 148,508

[22] PCT Filed: Jun. 25, 1987

[86] PCT No.: PCT/JP87/00418

§ 371 Date: Jan. 26, 1988

§ 102(e) Date: Jan. 26, 1988

[87] PCT Pub. No.: WO88/00171

PCT Pub. Date: Jan. 14, 1988

[30] Foreign Application Priority Data

Jun. 26, 1986 [JP] Japan ................... 61-148055

[51] Int. Cl.$^4$ .............................. C01B 7/04
[52] U.S. Cl. ........................ 423/502; 423/507
[58] Field of Search ................. 423/502, 507

[56] References Cited

U.S. PATENT DOCUMENTS

| | | | |
|---|---|---|---|
| 2,678,259 | 5/1954 | Banner et al. | 423/502 |
| 3,006,732 | 10/1961 | Baumgartner et al. | 423/502 |
| 4,427,578 | 1/1984 | Robinson et al. | 502/256 |

FOREIGN PATENT DOCUMENTS

| | | | |
|---|---|---|---|
| 184413 | 6/1986 | European Pat. Off. | 423/502 |
| 61-136902 | 6/1986 | Japan . | |
| 584790 | 1/1947 | United Kingdom | 423/502 |
| 676667 | 7/1952 | United Kingdom | 423/502 |

*Primary Examiner*—John Doll
*Assistant Examiner*—Jeffrey Edwin Russel
*Attorney, Agent, or Firm*—Oblon, Fisher, Spivak, McClelland & Maier

[57] ABSTRACT

In the process of producing chlorine by oxidizing hydrogen chloride with molecular oxygen, activity of the catalyst can be maintained for a long period with a high conversion ratio under high space velocity of gaseous raw materials without using additives as in conventional methods, in the presence of a crystalline chromic oxide catalyst obtained by supporting relatively large amounts of chromic oxide on a silicon oxide carrier having a specified pore volume.

7 Claims, No Drawings

MANUFACTURING PROCESS OF CHLORINE

BACKGROUND OF THE INVENTION (a) Field of the Invention

This invention relates to a manufacturing process of chlorine, and more particularly to an improvement for the process of producing chlorine by oxidizing hydrogen chloride gas with an oxygen containing gas.

(b) Description of the Prior Art

Chlorine is produced in large amounts by the electrolysis of sodium chloride. The electrolysis supplies a chlorine demand which has recently been in a sharp increase. The electrolysis of sodium chloride, however, co-produces sodium hydroxide which has a smaller demand than that of chlorine. Therefore it is difficult to successfully adjust the supply-demand imbalance, though the demand of chlorine and sodium hydroxide is tried to be met by the electrolysis of sodium chloride.

On the other hand, a great quantity of hydrogen chloride is produced as a by-product in the chlorination or phosgenation reaction of organic compounds. The amount of by-produced hydrogen chloride is far greater than the market demand of hydrochloric acid. Thus a large quantity of hydrogen chloride is discarded without utilization and moreover considerable expenses are required for its disposal.

Therefore, if chlorine can be efficiently recovered from by-produced hydrogen chloride which is abandoned as aforesaid in a large amount, the supply-demand balance of chlorine and sodium hydroxide will easily be able to be maintained by the conbination of sodium chloride electrolysis and oxidation of the by-produced hydrogen chloride.

The reaction of oxidizing hydrogen chloride to produce chlorine has been known as Deacon reaction for many years. In the reaction of preparing chlorine by oxidizing hydrogen chloride, the so-called "Deacon catalyst" which is a copper-base catalyst invented in 1868 has conventionally been considered to exhibit the highest activity. Since then, it has been proposed a number of catalysts which are added with various compounds as a third component to copper chloride and potassium chloride. The reaction temperatures, however, are required to be 450° C.and above in order to oxidize hydrogen chloride at a practical applicable reaction rate by use of these catalysts. The high temperature causes problems such as reduction of catalyst life accompanied by the vaporizing of catalyst ingredients. The use of catalysts other than copper-base including, for example, iron base etc. have been proposed in order to eliminate these problems, and yet no catalysts have been known to exhibit satisfactory performance for practical application. For example, chromic-oxide-base catalysts have been suggested to be generally superior in high-temperature stability and lifetime to the copper-base catalysts. No results, however, have been reported to show enough activity. That is, U.K. Pat. No. 584,790 discloses an intermittent process. In this process, hydrogen chloride is introduced to form chlorine at about 400° C. on the catalyst obtained by impregnating a suitable carrier with an aqueous solution of chromic acid or chromium nitrate and subjecting the impregnated carrier to thermal decomposition. When the catalyst is inactivated, the feed of hydrogen chloride is stopped and the catalyst is regenerated by introducing the air. Then the air flow is stopped and the feed of hydrogen chloride is started again to prepare chlorine.

Besides U.K. Pat. No. 676,667 discloses another process using a carrier-supported catalyst prepared from bichromate or dark-green chromic oxide, that is, unglowed chromia. In this process, hydrogen chloride and the oxygen containing gas are fed to react at a reaction temperature of 420 to 430° C. Hydrogen chloride is obtained with a conversion ratio of 67.4% of the equilibrium value at a space velocitY of 380 $Hr^{-1}$ and 63% at 680 $Hr^{-1}$. When the reaction temperature is lowered to 340° C., the reaction can also proceed and yet the conversion ratio obtained is only 52% even by maintaining the space velocity at a low level such as 65 $Hr^{-1}$. The prior art further discloses that chromia can not necessarily be active as the oxidizing catalyst of hydrogen chloride. That is, amorphous chromia is active for the oxidation of hydrogen chloride. It is required to carry out the heat-treatment of chromic anhydride at a temperature of 400° C. or less in order to prepare the amorphous chromia catalyst. Chromia is clearly illustrated to crystallize by heating above 500° C. and to loose its catalitic activity for the hydrogen chloride oxidation.

Furthermore, the chromia catalyst has a short life in the oxidation of hydrogen chloride and cannot be employed for industrial operation. As a means of overcoming the drawback, U.K. Pat. No. 846,852 (corresponding to U.S. Pat. No. 3,006,732) discloses that the catalyst life can be extended by incorporating a small amount of chromyl chloride ($CrO_2Cl_2$) in the raw material. As shown above, the intact chromia catalyst cannot be employed in continuous operation for a long period as a result of its short life. In addition, the patent also discloses that high activity is exhibited by the amorphous chromia prepared by calcining ammonium bichromate or chromic anhydride at a temperature of 500° C. and less, preferably 350 to 400° C.

As aforementioned, the conventionally known processes could not improve the drawbacks of short catalyst life, high reaction temperature and low space velocity, even though chromic oxide is used as the catalyst. Therefore these processes could not withstand the industrial operation unless new reacting agents, such as chromyl chloride were incorporated. That is, the traditional chromic oxide catalyst did not specifically exhibit excellent properties as compared with the copper-base catalyst.

SUMMARY OF THE INVENTION

In view of the aforesaid problems, the present inventors have investigated for providing a catalyst which has a high activity and a long lifetime and also efficiently accelerates the oxidizing reaction of hydrogen chloride with molecular oxygen at relatively lower temperatures. Consequently, it has been found that such catalyst can be obtained by selecting and controlling the silicon oxide carrier to be used, the amount of catalyst to be supported, and the temperature of heat-treatment to be conducted. And thus the present invention has been achieved.

That is, a production process of chlorine in this invention by the oxidation of hydrogen chloride with molecular oxygen is characterized by oxidizing in the presence of a chromic oxide catalyst obtained by supporting chromic oxide in an amount of 20 to 90 wt. % as chromia on a silicon oxide carrier having a pore volume in the range of 0.3 to 1.8 cc/g and conducting a heat-treatment at a temperature of 450 to 700° C.

The chromic oxide catalyst for use in the present invention is particularly preferable for the employment on the oxidizing reaction at a relatively low temperature and a high space velocity of gaseous raw materials. The oxidizing reaction is carried out with a reaction temperature of from 350 to 430° C., a molar ratio of the molecular oxygen in an oxygen containing gas to the hydrogen chloride of from 0.25 to 5 and a feed amount of the hydrogen chloride of from 200 to 1800 Nl/kg catalyst per hour. The fluidized bed reaction is suitable for present invention.

The chromic oxide catalyst used in the present invention is preferably prepared by contacting an aqueous solution of chromic anhydride or a chromium salt with a silicon oxide carrier and successively subjecting the resultant carrier to drying and heat-treatment.

The silicon oxide carrier for use in the catalyst has preferably a surface area of 100 to 600 m$^2$/g, an average pore diameter of 20 to 300 Å, and a sodium content and an iron content of 0.5 wt. % or less respectively. Furthermore, the chromic oxide catalyst thus obtained has preferably a microcrystal size of 200 to 500 Å.

BEST MODE OF THE INVENTION

The carrier of the catalyst for use in the process of this invention is silicon oxide and usually applied in the form of amorphous silica gel. Silica may also be used in the presence of a small amount of alumina, titania, zirconia, etc.

Silica gel as a preferred carrier has generally a pore volume ranging 0.3 to 1.8 cc/g and more preferably ranging 0.5 to 1.5 cc/g, a surface area in the range of 100 to 600 m$^2$/g, and an average pore diameter of 20 to 300 Å range. In these cases, when the pore volume is less than 0.3 cc/g, chromic oxide covers the surface of silicon oxide and is liable to release from the surface. On the other hand, silica gel having the pore volume of 1.8 cc/g and more is difficult to prepare and even if it can be prepared, the catalyst cannot be applied because of its low mechanical strength.

Silicon oxide usually contains sodium, iron etc. as contaminants. The catalysts for use in this invention employs silicon oxide having a sodium content of 0.5 wt. % or less and an iron content of 0.5 wt. % or less, more preferably 0.1 wt. % or less. When the content of above contaminants exceeds 0.5 wt. %, all of the resulting catalysts have low activity.

The silicon oxide carrier employed in this invention is preferably heat-treated at a temperature of 300 to 500° C. for 1 to 10 hours generally prior to supporting chromia.

As the raw materials of chromic oxide used in the process of this invention, normally employed are the aqueous solution of chromic anhydride (CrO$_3$) or chromium salts. The chromium salts which may be used include, for example, inorganic chromium salts such as chromic sulfate, chromic nitrate, chromic chloride etc., and chromium salts of organic acids such as chromic acetate etc. which provide chromia (Cr$_2$O$_3$) by thermal decomposition. Normally, it is most convenient to dip the carrier into the aqueous solution containing these compounds. The carrier is then separated and dried to prepare the catalyst. The catalyst can be prepared with a low cost by this method.

The supported amount of chromia on the carrier is relatively in a high level and in the range of 20 to 90 wt. %. For example, it is supported on the carrier by 1 to 3 impregnating operations with the aqueous solution of chromic anhydride having a concentration of 20 to 60 wt. %. When the supported amount is 60 wt. % and more in particular, dipping procedures are preferably performed at least twice for supporting the catalyst. At the first operation, impregnation and supporting are applied in a quantity corresponding to $\frac{1}{3}-\frac{1}{2}$ of the desired amount. After drying the impregnated carrier, the operation for impregnating the aqueous solution of chromic anhydride and drying the carrier is preferably repeated again to obtain the prescribed amount of supported chromia.

After supporting the prescribed amount of chromia, the heat-treatment is conducted normally for about 1 to 10 hours at a temperature of 450 to 700° C., preferably 490 to 700° C., more preferably 500 to 700° C., and exceeding 500° C. up to 700° C. under certain conditions. When the heat-treatment temperature is lower than 450° C., the catalyst has an amorphous form and a short lifetime. In other words, the catalyst exhibits high initial activity and yet the activity drops rapidly. Furthermore, the ingredients of the catalyst are liable to vaporize. On the other hand, when the heat-treatment is carried out at a temperature of 700° C. and more, crystals are grown by the heat-treatment. As a result., the size of microcrystals becomes too large, which leads to the decrease of catalyst activity.

In addition, when the catalyst has a supported amount of chromia of less than 20 wt. % after the heat-treatment, the activity of catalyst is low, the quantity of hydrogen chloride converted is small and moreover the catalyst lifetime is short. Accordingly it is necessary to support in an amount of 20 wt. % and more, preferably 40 wt. % and more, which results in a long lifetime of the catalyst. On the other hand, even though the supported amount of chromia exceeds 90%, further improvement of the activity and lifetime can not be expected and the mechanical strength of the catalyst is reduced. Therefore the catalyst can not be applied in a supported amount of exceeding 90 wt. %. Since the amount of attrition loss is particularly increased in employing for the catalyst of fluidized bed process, the supported amount is preferably about 80% or less and more preferably maintained at about 60 to 70 wt. %.

The chromic oxide catalyst heat-treated in the above-mentioned temperature range is crystals. The microcrystals have a size of normally ranging 200 to 500 Å and are not amorphous.

In the process of this invention, the reaction temperature for oxidizing hydrogen chloride with molecular oxygen is preferably maintained in the range of 350 to 430° C. and particularly preferred is the range of 370 to 420° C. The higher reaction temperature leads to the higher conversion velocity of hydrogen chloride to chlorine, whereas it accompanies lowering of the equilibrium conversion ratio and increasing the vaporization of the catalyst. Accordingly, the above-mentioned temperature range is selected for the reaction.

Besides, the oxidizing agent which may be used in the process of this invention is molecular oxygen, and oxygen gas or the air is usually employed. The molar ratio of molecular oxygen in an oxygen containing gas to the hydrogen chloride is in the range of preferably 0.25 to 5, and more preferably 0.3 to 0.75. The amount of oxygen less than the stoichiometric amount of 0.25 results in a low conversion ratio. On the other hand, excess of oxygen in the molar ratio is economically unfavorable.

The amount of hydrogen chloride fed to the catalyst bed is suitably in the range of 200 to 1800 Nl/kg catalyst, preferably 300 to 1000 Nl/kg catalyst per hour. Besides the reactors which may be used are fixed bed or fluidized bed, and the fluidized bed reactors are particularly suitable for the practice of the process of this invention.

According to the conventional information as stated above, chromia which exhibits catalytic activity for the oxidation of hydrogen chloride is in the amorphous form obtained by the heat-treatment at a temperature of 500° C. and less, preferably 350 to 400° C. Chromia treated at high temperatures of above 500° C. has been considered to crystallize and eliminate the catalytic activity.

According to the process of this invention, however, the chromic oxide catalyst can be used in the conditions of high space velocity of gaseous raw materials and high conversion ratio. In addition, the catalyst can maintain its activity for a long period without feeding the raw materials of the reaction together with the additives such as described in U.K. Pat. No. 846,852.

That is, the present invention provides a technically advantageous process which can produce chlorine from hydrogen chloride stably and efficiently for a long period.

The process of this invention will hereinafter be described in detail with respect to the following examples and comparative examples.

Besides the surface area, average pore diameter and pore volume of the silicon oxide carrier were measured by the nitrogen gas adsorption method, that is, according to the method for the determination of nitrogen gas adsorption at a temperature of liquefied nitrogen [Refer to CLYDE ORR Jr. and J.M. DALLVALLE, "Fine Particle Measurement", The Macmillan Co., NY. (1959)].

EXAMPLE 1

Silica gel microspheres having a diameter of 80 to 250 meshes (pore volume 0.75 cc/g) were dipped into a 20 wt. % aqueous solution of chromic anhydride, filtered and excess solution was removed. After drying at 120° C., the resultant spheres were heat-treated in air at 350 to 400° C. for 2 hours. The above procedures were repeated 3 times and finally heat treatment was carried out at 500° C. for 3 hours to prepare the catalyst. The catalyst thus obtained exhibited crystalline structure according to the X-ray diffraction analysis. The size of microcrystals calculated from the broadening of diffraction pattern was 276 Å in face 104 and 280 Å in face 110. Analytical values of the catalyst were 48 wt. % chromia and 52 wt. % silica.

In a fluidized bed reactor having an internal diameter of 4 inches was charged with 2 kg of the catalyst obtained above. Hydrogen chloride gas and oxygen gas were fed with a velocity of 800 Nl/hr and 400 Nl/hr respectively, and reacted at a temperature of 400° C. The resulting gas was absorbed into an aqueous solution of potassium iodide. The absorbed solution was titrated with sodium thiosulfate to obtain the conversion ratio of 78%. The reaction was conducted continuously. The conversion ratio of hydrogen chloride obtained was 73% after 10 days, 70% after 30 days, and the latter value was maintained thereafter for a long period.

EXAMPLE 2

Silica gel microspheres having a diameter of 20 to 150 μm (pore volume 1.28 cc/g) were dipped into a 50 wt. % aqueous solution of chromic anhydride, filtered and excess solution was removed. After drying at 120° C., the resultant spheres were heat treated in air at 350 to 400° C. for 2 hours. The above procedures were repeated 3 times and finally heat-treatment was carried out at 500° C. for 3 hours to prepare the catalyst. The catalyst thus obtained exhibited crystalline structure according to the X-ray diffraction analysis. The size of micro-crystals calculated from the broadening of diffraction pattern was 280 Å in face 104 and 290 Å in face 110. Analytical values of the catalyst were 68 wt. % chromia and 32 wt. % silica.

In the same fluidized bed reactor as in Example was charged with 2 kg of the catalyst obtained above. Hydrogen chloride gas and oxygen gas were reacted by use of the same feeding conditions and reaction temperature as in Example 1. The resulting gas was absorbed into an aqueous solution of potassium iodide. The absorbed solution was titrated with sodium thiosulfate to obtain the conversion ratio of 80%. The reaction was conducted continuously. The conversion ratio of hydrogen chloride was 74% after 10 days and 72% after 30 days, and the latter value was maintained thereafter for a long period.

EXAMPLES 3-9, COMPARATIVE EXAMPLES 1-2

Catalysts were prepared by the same procedure as in Example 2 so as to have various supported amounts of chromia. The reaction in Example 1 was repeated by using the catalysts thus obtained. The results are illustrated in Table 1. pg,17

TABLE 1

| Classification | Example | | | | | | | Comparative example | |
|---|---|---|---|---|---|---|---|---|---|
| | 3 | 4 | 5 | 6 | 7 | 8 | 9 | 1 | 2 |
| Supported amount of chromia (wt. %) | 20 | 25 | 30 | 40 | 60 | 70 | 85 | 10 | 15 |
| Initial activity (HCl conversion ratio) | 62 | 70 | 72 | 75 | 76 | 79 | 80 | 47 | 54 |
| Activity after 10 days (HCl conversion ratio) | 52 | 64 | 67 | 71 | 71 | 74 | 75 | 20 | 31 |

EXAMPLES 10-14, COMPARATIVE EXAMPLES 3-4

Carriers were changed in the procedures of Example 1 and catalysts were prepared to have a supported amount of 38 to 43 wt. % and 55 to 60 wt. % as chromia. The activity of the catalysts obtained was measured by the same method as in Example 1. Results are illustrated in Table 2.

TABLE 2

| Classification | Example | | | | | Comparative example | |
|---|---|---|---|---|---|---|---|
| | 10 | 11 | 12 | 13 | 14 | 3 | 4 |
| Pore volume of silica (cc/g) | 0.35 | 0.60 | 0.78 | 1.43 | 1.81 | 0.22 | 1.95 |
| Supported amount of chromia (wt. %) | 38 ~ 43 | ← | ← | 55 ~ 60 | ← | 38 ~ 43 | 55 ~ 60 |
| Initial activity | 70 | 74 | 75 | 80 | 81 | 60 | 74 |

TABLE 2-continued

| | Example | | | | | Comparative example | |
|---|---|---|---|---|---|---|---|
| Classification | 10 | 11 | 12 | 13 | 14 | 3 | 4 |
| (HCl conversion ratio %) | | | | | | | |
| Activity after 10 days (HCl conversion ratio %) | 66 | 71 | 71 | 73 | 74 | 50 | 70 |

EXAMPLES 15–17, COMPARATIVE EXAMPLES 5–6

Silica gel having a pore volume of 1.2 cc/g was dipped into the aqueous solution of chromic anhydride to prepare catalyst having a supported amount of 70 wt. % as chromia. Heat-treatment was conducted independently at 400, 500, 600, or 700° C. for each part of the catalyst. Activity of the heat-treated catalysts was measured by the same method as in Example 1. The results are illustrated in Table 3.

TABLE 3

| | Example | | | Comparative example | |
|---|---|---|---|---|---|
| Classification | 15 | 16 | 17 | 5 | 6 |
| Heat-treatment temperature (°C.) | 500 | 600 | 700 | 400 | 800 |
| Initial activity (HCl conversion ratio %) | 79 | 76 | 73 | 78 | 64 |
| Activity after 10 days (HCl conversion ratio %) | 74 | 73 | 70 | 37 | 60 |

COMPARATIVE EXAMPLE 7

A catalyst was prepared by repeating the procedure of Example 1 except the final heat-treatmet was conducted at a temperature of 410° C. X-ray diffraction result of the resultant catalyst exhibited no crystallinity and the catalyst was amorphous.

The same reaction as in Example 1 was carried out by using above obtained catalyst.

The hydrogen chloride conversion ratio was 76% after 10 hours from the start of reaction, 62% after 2 days, and 49% after 5 days. Besides evaporation of chromium from the catalyst was found during the reaction and chromium compounds were deposited around the outlet of the reactor.

We claim:

1. A manufacturing process of chlorine which comprises oxidizing hydrogen chloride with molecular oxygen in the presence of a chromic oxide catalyst, which has a microcrystal size of from 200 to 500 Å, and which is obtained by supporting chromic oxide in an amount of from 20 to 90 wt. % as chromia on a silicon oxide carrier having a pore volume in the range of from 0.3 to 1.8 cc/g and conducting a heat treatment at a temperature of from 450° to 700° C.

2. The manufacturing process of chlorine as claimed in claim 1 wherein the chromic oxide catalyst is obtained by contacting an aqueous solution of chromic anhydride or a chromium salt with a silicon oxide carrier and successively subjecting the resultant carrier to drying and heat-treatment.

3. The manufacturing process of chlorine as claimed in claim 1 wherein the temperature of the oxidation is 350° to 430° C., the molar ratio of the molecular oxygen in an oxygen containing gas to the hydrogen chloride is 0.25 to 5, the feed amount of the hydrogen chloride is 200 to 1800 Nl/kg catalyst per hour, and the reaction type is a fluidized bed reaction.

4. The manufacturing process of chlorine as claimed in claim 1 wherein surface area of the silicon oxide carrier is 100 to 600 m$^2$/g.

5. The manufacturing process of chlorine as claimed in claim 1 wherein the average pore diameter of the silicon oxide carrier is 20 to 300 Å.

6. The manufacturing process of chlorine as claimed in claim 1 wherein the silicon oxide carrier contains 0.5 wt. % or less of sodium and 0.5 wt. % or less of iron.

7. The manufacturing process of chlorine as claimed in claim 1 wherein the silicon oxide carrier is subjected to a heat-treatment at a temperature of 300 to 500° C. prior to supporting the chromia.

* * * * *